United States Patent Office 3,546,934
Patented Dec. 15, 1970

3,546,934
CONSTANT DEBIT GAUGING WHEEL
Pierre Auchapt, Bagnols-sur-Ceze, and André Brun, Orsan, France, assignors to Commissariat a l'Energie Atomique, Paris, France
Filed Sept. 20, 1968, Ser. No. 761,212
Claims priority, application France, Sept. 25, 1967, 122,707
Int. Cl. G01f 1/00
U.S. Cl. 73—194                                   3 Claims

ABSTRACT OF THE DISCLOSURE

A device for gauging the flow-rate of a liquid has, within a constant level-vessel fed with liquid by means of a non-gauging system, a wheel driven by an adjustable speed-motor. The wheel has a first cup that draws the liquid from said vessel through a filling aperture and a second cup whose capacity is half the capacity of the first cup. The second cup communicates with said first cup through a connecting channel. Two outlet channels discharge the gauged liquid by means of a duct and of a collector.

---

The present invention relates to a gauging wheel to gauge the flow-rate of a liquid.

A device in general use, called a "gauging wheel," for gauging the flow-rate of a liquid has a set of cups symmetrically disposed around an axis. The cups are alternatively filled and emptied, which has the disadvantage of supplying an irregular outlet discharge. The irregular discharge can be partially prevented by using a damping device.

The object of the present invention is to provide a "gauging wheel" device answering the various requirements of practice, particularly, in supplying an absolutely constant discharge with a particularly simple structure.

The device according to the invention comprises, within a constant level-vessel fed with liquid by means of a non-gauging system, a wheel driven by an adjustable speed-motor having a first cup that draws liquid from said vessel through a filling aperture and a second cup whose capacity is half the capacity of the first cup which communicates with said first cup through a connecting channel and two outlet channels discharging the gauged liquid to a weir and to a collector.

Figure 1:
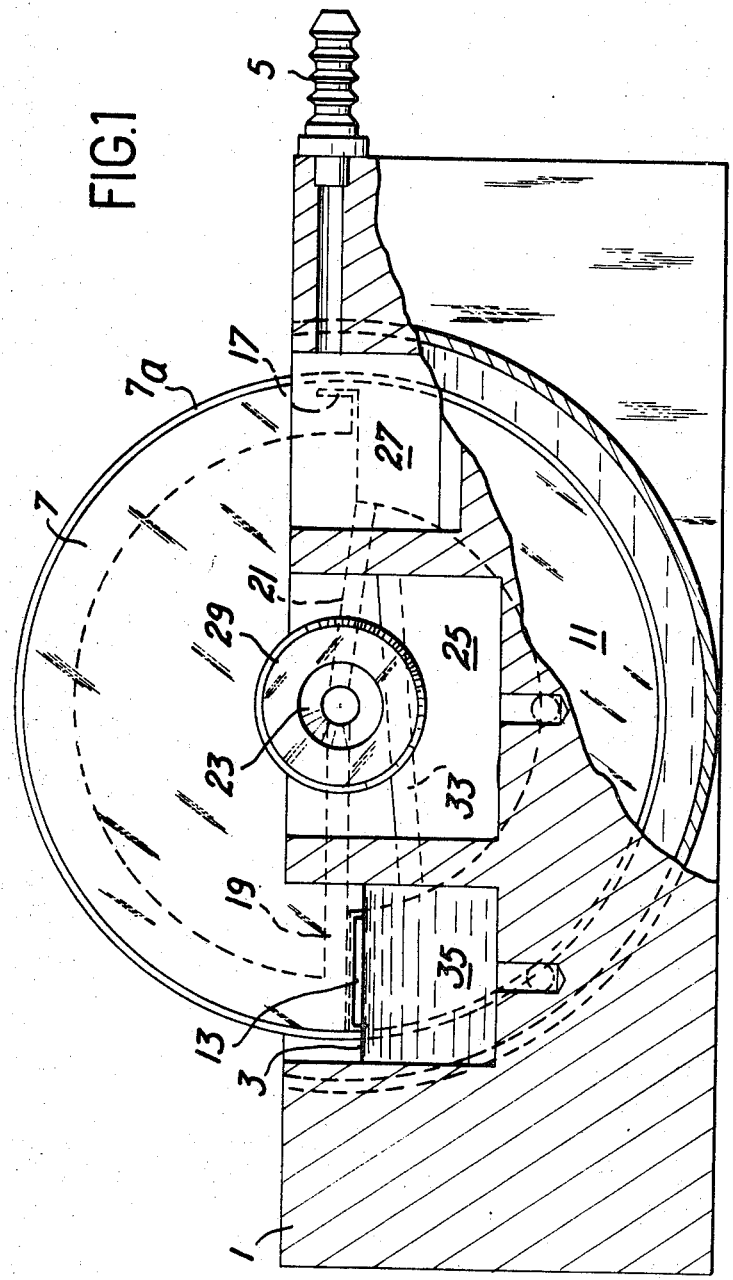
Figure 2:
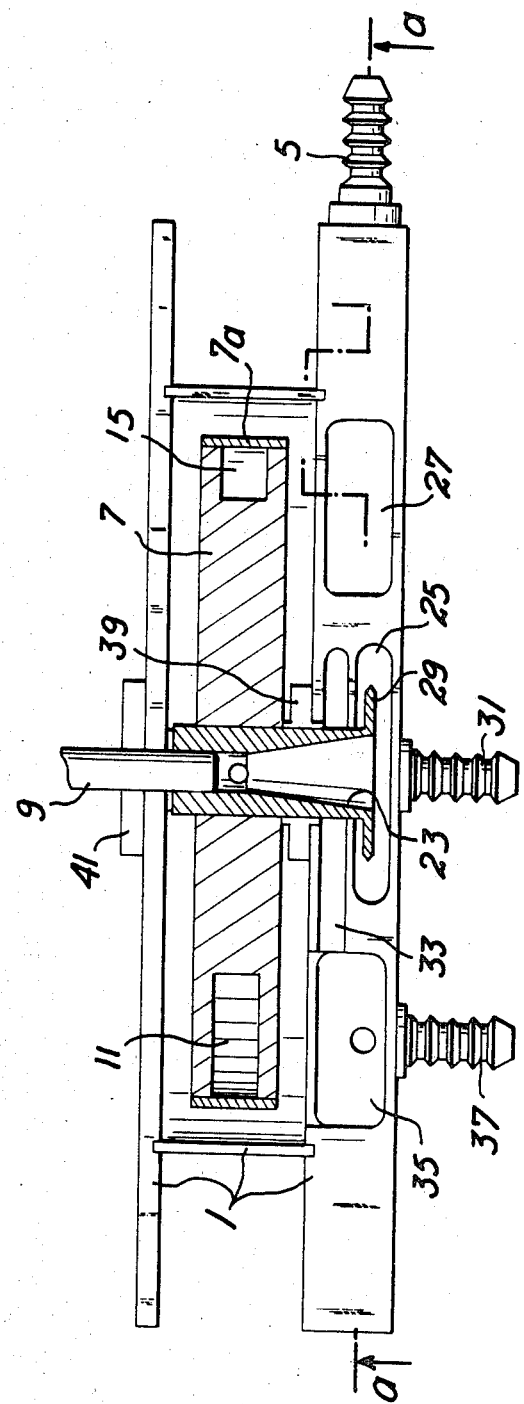

The invention will be now described with reference to the accompanying drawings in which:

FIG. 1 is a sectional view on the line a—a of the FIG. 2,
FIG. 2 is a top view of an embodiment of the device according to the invention.

As may be seen from the drawings, the device according to the invention is essentially made of two parts:

A vessel 1 with a constant level 3, fed with liquid through inlet 5 by means of a non-gauging system (an airlift system for instance), A wheel 7 rotated by shaft 9 and by an adjustable speed-motor forming the gauging device.

The wheel 7 comprises:
A first semi-circular annular cup 11 in one-half of wheel 7 drawing liquid to be gauged from vessel 1 through the filling aperture 13 at one end thereof,
A second semi-circular annular cup 15 in the other half of wheel 7 in communication with the first cup 11 through a connecting channel 17 of small cross-section at the other end of cup 11 and diametrically opposite aperture 13. Said second cup 15 has a capacity that is exactly half the capacity of cup 11.

Referring more particularly to FIG. 2, it may be seen that the front part of the vessel 1 comprises successively, three different chambers:

A feeding chamber 27 in communication with inlet 5 for the liquid,
A collecting chamber 25 in which rotates a conical outflow chamber 23 with its guard 29, in communication with the outlet 31 for the gauged liquid and with a channel 33 in communication with
An overflow chamber 35 provided with an overflow duct 37.

Bearings 39 and 41 support wheel 7 in rotation.

The device operates as it follows, starting from the time zero at which the cups in wheel 7 are empty.

As wheel 7 rotates first cup 11 is filled through its filling aperture 13. The end of the filling-up operation is determined by the position of the overflow duct 37 and its chamber 35 in the constant level-vessel 1. The speed of wheel 7 is low to bring the level within the cup 11 rapidly into equilibrium. The position of the overflow duct 37 is so fixed that, at the end of the filling operation for cup 11, the level in said cup is in connecting channel 17. Thus the volume of liquid in cup 11 will relatively be constant.

As the wheel 7 rotates, the liquid enters the second cup 15, but the capacity of cup 15 being smaller than that of cup 11, a part of the liquid escapes through the outlet channels 19 and 21 and out of wheel 7. The inlet of channel 19 is diametrically opposite channel 7 and the inlet of channel 21 is substantially diametrically opposite the inlet of channel 19 with channels 19 and 21 opening into central chamber 23. It is easily proved that the capacity of the cup 15 must be exactly half that of the cup 11 to provide a constant discharge at the outlet 31 of the wheel. For instance, starting from the end of the filling operation, when the wheel has rotated through a quarter of a turn, the level is such that cup 11 and cup 15 are only half full. Therefore, a quarter of the volume of liquid previously drawn has escaped.

Thus, beginning at the end of the first half turn of rotation of wheel 7, or at the end of filling of the large chamber 11, chamber 11 is progressively emptied. At this point the small chamber 7 is capable of receiving half of the volume of water discharge from large chamber 11. The other half is evacuated toward the central chamber 23 by duct 21. At the end of the second half turn of wheel 7, large chamber 11 is totally emptied, half of its content having been evacuated to central chamber 23 while small chamber 7 is completely full. Small chamber 7 then begins to empty through duct 19 while large chamber 11 begins another filling stage.

In addition to the fact that it supplies a constant discharge, another advantage of said wheel is that it has a very simple structure. The choice of the material is unimportant. Stainless steel, methyl methacrylate, "Teflon," polyethylene, etc. may be used. The apparatus, which was constructed, has been made of methyl methacrylate and a covering ring 7a had a thickness of $\frac{1}{10}$ mm.

It is obviously possible to make this apparatus of any size, but, by way of example, the apparatus shown in the drawings discharges at a rate comprised between 0 and 20 l./h. Its rotation is about 6 tr./mn. The accuracy of the apparatus depends on careful construction. It must be to a tolerance of a few percent. It will be noted that the constant level-vessel 1 must be fed at a flow rate equal to at least twice the discharge rate of the wheel.

The present invention is not limited to the details given herein and may be modified within the scope of the appended claims.

What we claim is:
1. A metering wheel liquid dispenser comprising a vessel for containing liquid to be dispensed therefrom at a constant rate, means for feeding unmetered liquid to the vessel, a wheel mounted so that it is rotatable with at least its lower part immersed in the liquid in the vessel, means for driving the wheel, the wheel having a first and a second annular scoop for rotation therewith, each scoop occupying a semi-circular portion of the wheel, and the second scoop having a capacity equal to half that of the first scoop, an aperture in the first scoop into which liquid can flow from the vessel during the rotation of the wheel through the lower portion of its rotational path, a connecting channel for communication between said scoops through which liquid from said first scoop flows to said second scoop, an outlet channel from each scoop, and a collecting means into which liquid flows from the said outlet channels and from which the metered liquid is dispensed.

2. A dispenser according to claim 1, in which said collecting means includes a conical chamber, said conical chamber communicating with the said outlet channels and with a chamber surrounding said conical chamber and which communicate with a duct from which metered liquid is dispensed.

3. A dispenser according to claim 1 wherein the scoops are located in the wheel.

References Cited

UNITED STATES PATENTS

| | | | |
|---|---|---|---|
| 497,424 | 5/1893 | Buxton | 73—218 |
| 1,254,452 | 1/1918 | Vai et al. | 73—217 |

FOREIGN PATENTS

| | | | |
|---|---|---|---|
| 686,250 | 1/1940 | Germany | 73—217 |

RICHARD C. QUEISSER, Primary Examiner

J. K. LUNSFORD, Assistant Examiner

U.S. Cl. X.R.

222—56